June 8, 1943.  H. E. HODGSON  2,321,205
ELECTROMAGNETIC BRAKE
Filed Nov. 28, 1941  2 Sheets-Sheet 1

Inventor
Howard E. Hodgson
By Frank H. Hubbard
Attorney

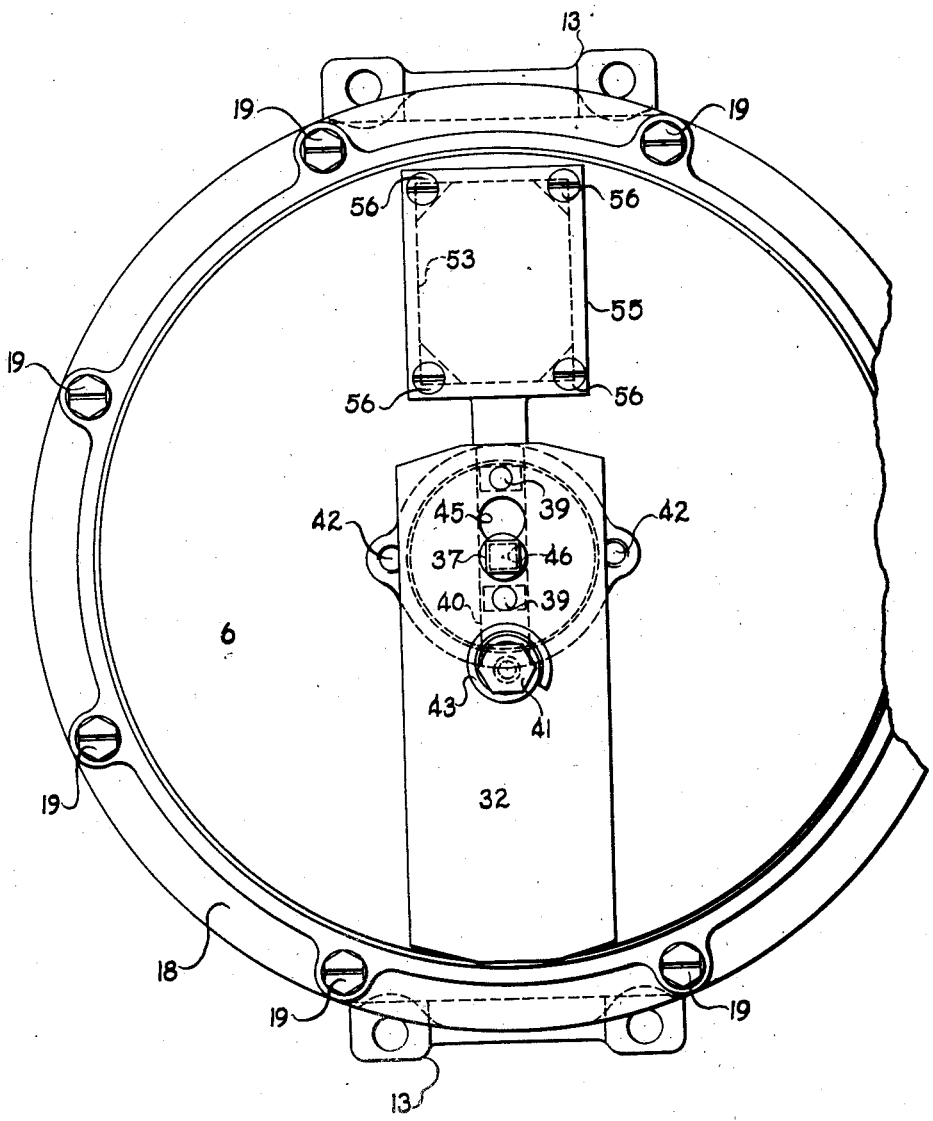

Patented June 8, 1943

2,321,205

UNITED STATES PATENT OFFICE 2,321,205

ELECTROMAGNETIC BRAKE

Howard E. Hodgson, Wauwatosa, Wis., assignor to Cutler-Hammer, Inc., Milwaukee, Wis., a corporation of Delaware Application November 28, 1941, Serial No. 420,801

7 Claims. (Cl. 188—171)

This invention relates to electromagnetic brakes, and is particularly applicable to disk type brakes for use in connection with electric motors.

The invention has among its objects to simplify and generally improve the construction and operation of brakes of the aforesaid type.

Another object is to provide a totally enclosed brake of the aforesaid type having accessible means on the exterior thereof for effecting required adjustments of the brake and also manual release thereof.

Another object is to provide a rugged and compact brake of the aforesaid type which is adapted for horizontal or vertical mounting and which can be readily dis-assembled for inspection or renewal of the brake linings.

Another object is to provide an electromagnetic brake in which the operating magnet and its associated armature, the brake setting spring and a friction plate associated with the armature constitute an assembly which is removable as a unit with a minimum of axial displacement.

Another object is to provide an electromagnetic brake having a single lever for adjusting the brake setting spring and for effecting manual release of the brake.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

In the drawings,

Fig. 2 is a front elevational view of the brake shown in Fig. 1, and

Figure 1:
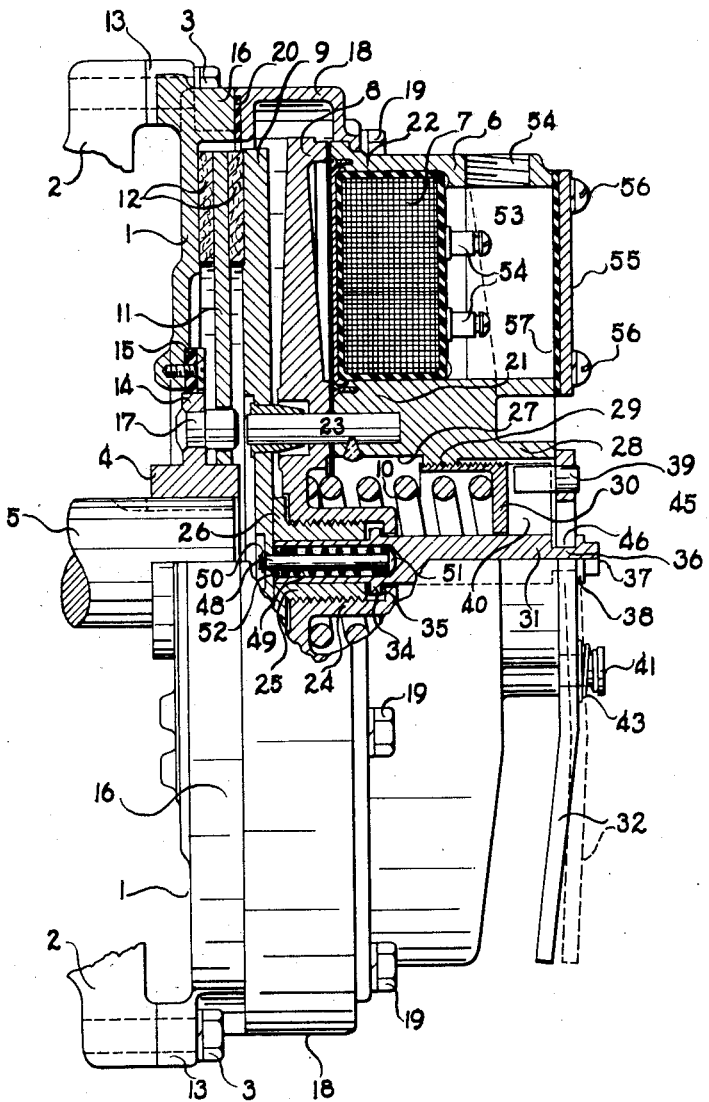
Figure 1 is a side view of a brake embodying the invention, a part of the brake being shown in section.

The brake illustrated is designed for use in connection with an electric motor and as shown in Fig. 1 the same is provided with a circular mounting plate 1 to be secured to the motor housing 2 (partly shown) by screws 3 and a hub 4 to be keyed to the motor shaft 5. Mounting plate 1 carries an assembly including a circular field member 6, an annular magnet coil 7, a circular armature 8, a circular friction disk 9 and a brake setting spring 10. Hub 4 carries a circular friction disk 11 having friction linings 12 mounted upon opposite sides thereof to be clamped between mounting plate 1 and friction disk 9 under the action of spring 10.

More specifically, mounting plate 1 has foot projections 13—13 formed on opposite sides thereof which are drilled to receive the securing screws 3 and the same is provided with a center opening for receiving an outwardly extending peripheral flange 14 formed on hub 4. Said mounting plate has an annular gasket 15 mounted thereon for engaging the periphery of flange 14 and the same is also provided with an annular rim projection 16 which surrounds the friction disk 11. Friction disk 11 is provided with a center opening for receiving hub 4 and is also provided with a plurality of openings for receiving pins 17 which are fixed to the hub flange 14. Friction disk 11 is thus coupled to rotate with hub 4 and is also free to move axially thereon.

Field member 6 is fixed within a shrunk-on non-magnetic ring member 18 which is secured to the rim projection 16 on mounting plate 1 by screws 19. Ring member 18 projects beyond the rear face of field member 6 and a gasket 20 is interposed between said ring member and the rim projection 16 on mounting plate 1. The inner face of field member 6 is recessed to provide a cylindrical inner pole projection 21 and an annular outer pole projection 22, and magnet coil 7 is mounted in the annular space between said pole projections. Armature 8 and friction disk 9 are slidably mounted and held against rotation upon pins 23 which are fixed within openings in the inner end of pole projection 21. Armature 8 is provided with a center cylindrical extension 24 having a threaded opening therein for receiving a nut 25 which is provided with an enlarged circular head 26 for engaging the front face of friction disk 9. Field member 6 is provided with a center opening 27 which extends through a cylindrical projection 28 formed on the face of said field member and said opening has a threaded portion 29 for receiving an externally threaded cup nut 30. The brake setting spring 10 is located within opening 27 and is held under compression between cap nut 30 and the armature member 8.

As is apparanet from the foregoing, when magnet coil 7 is deenergized armature 8 is biased away from field member 6 by spring 10 and the force of said spring is transmitted from armature 8 through nut 25 to friction disk 9 whereby friction disk 11 is clamped between friction disk 9 and mounting plate 1 for setting of the brake. With the brake in set position there is an air gap between armature member 8 and field member 6 and upon energization of magnet coil 7 said armature member is moved into engagement with the pole projections 21 and 22 against the action of spring 10 to thereby relieve friction disk 9 from the pressure of said spring for release of the brake.

As will now be set forth, nut 25 is adjustable by a stem 31 to compensate for wear of the friction linings 12, and cup nut 30 is adjustable by a lever 32 to vary the degree of compression of spring 10 for variation of the braking pressure applied to disk 11. Also as hereinafter set forth, lever 32 is operatively connected through stem 31 to armature 8 to provide for manual release of the brake.

Figure 3:
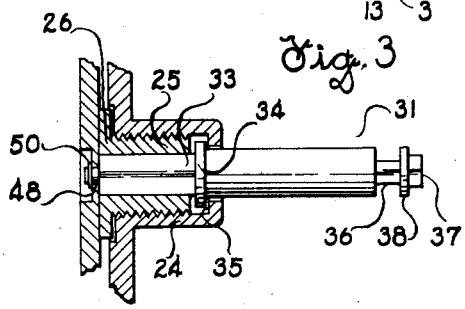
Fig. 3 is a fragmentary view of certain of the parts shown in Fig. 1.

As shown in Fig. 3, stem 31 has a squared portion 33 formed on the inner end thereof which fits within a square center opening in nut 25 and said stem is also formed to provide a collar 34 which is located between the front end of nut 25 and a shoulder 35 formed on the front end of the center extension 24 of armature 8. Stem 31 extends forwardly beyond the projection 28 on the front face of field member 6 and the front end of said stem is provided with squared portions 36 and 37 which are located on opposite sides of a collar 38.

Lever 32 comprises an elongated flat plate having a pair of spaced pins 39—39 mounted adjacent one end thereof which engage within a diametrically disposed slot 40 in the front face of cup nut 30. Lever 32 is held in assembled position upon field member 6 by a screw 41 which may be inserted into any one of a plurality of tapped openings 42 (Fig. 2) in the front end of projection 28 on field member 6, and said lever is yieldingly held against the front end of said projection by a spring 43 which is held under compression between said lever and an enlarged head on the front end of said screw. As shown in Fig. 2, lever 32 is provided with a circular opening 45 having a rectangular slot 46 on one side thereof for receiving the squared portion 36 on adjusting stem 31.

To effect manual release of the brake, lever 32 is moved forwardly from the full line position to the dotted line position shown in Fig. 1. Upon forward movement of lever 32 into its dotted line position the inner end of said lever is fulcrumed upon the front end of projection 28 on field member 6 and collar 38 is engaged by said lever to move stem 31 forwardly out of the position shown in Fig. 1. Upon forward movement of stem 31 the collar 34 thereof engages shoulder 35 on extension 24 of armature member 8 to move said armature member forwardly against the action of spring 10 and friction disk 9 is thus relieved of the pressure of said spring for release of the brake.

With lever 32 held in assembled position upon field member 6 by the screw 41 cup nut 30 is locked against rotation by engagement of pins 39 within the slot 40 in the front face of said nut and stem 31 is locked against rotation by engagement of the squared portion 36 thereof within the rectangular slot 46 in said lever. When it is desired to effect adjustment of the brake, screw 41 is removed and lever 32 is moved longitudinally into a position wherein the squared portion 36 of stem 31 is located within the circular opening 45 in said lever. Stem 31 may then be rotated by means of a wrench applied to the squared portion 37 thereof to move nut 33 within the extension 24 of armature 8 for axial adjustment of said armature with respect to friction plate 9. Stem 31 therefore provides for adjustment of the air gap between armature 8 and field member 6 to compensate for wear of the friction linings 12. When lever 32 is disengaged from stem 31 the same may be rotated independently of said stem to effect adjustment of cup nut 30 through the medium of the pins 39 for variation of the braking pressure exerted by spring 10. As is apparent, the pin and slot connection 39—40 between cup nut 30 and lever 32 limits inward adjustment of said nut and thereby prevents compression of spring 10 to such a degree as to render the magnet cooperative to effect release of the brake. After adjustment of the brake, lever 32 is moved into locking engagement with the squared portion 36 of stem 31 and the same is then re-assembled in the required angular position upon field member 6 by means of screw 41 and spring 43.

Upon release of the brake, friction disk 9 is yieldingly held in engagement with the head 26 of nut 25 by a spring pressure device comprising a pin 48 and a coil spring 49 which surrounds said pin. Pin 48 is slidable within an opening in the rear end of stem 31 and the inner end of said pin extends through a center opening in friction disk 9 and has a ring 50 attached thereto for engaging the rear face of said disk. The front end of pin 48 is provided with a head 51 and spring 49 is held under compression against said head by pins 52 fixed to the inner end of stem 31.

In connection with the foregoing it should be noted that field member 6, ring member 18, armature 8, friction disk 9, spring 10 and the adjusting mechanism for the brake constitutes an assembly which is removable as a unit from mounting plate 1 upon removal of screws 19. The rear face of ring 18 is substantially flush with the front face of friction disk 11, and the field assembly may be therefore removed from mounting plate 1 without substantial axial displacement thereof. Also it should be noted that the non-magnetic ring 18 provides for passage of substantially all of the flux of magnet coil 7 through the armature member 8.

The front wall of field member 6 is formed to provide a rectangular wiring housing 53 for receiving terminals 54 associated with the magnet coil 7. The upper wall of housing 53 is provided with a tapped conduit opening 54 and said housing is provided with a removable front cover plate 55. Cover plate 55 is secured to the housing 53 by screws 56 and has a gasket 57 interposed between the same and said housing.

What I claim as new and desire to secure by Letters Patent is:

1. A multi disk friction brake including a stationary braking element and a circular assembly detachably mounted upon said stationary braking element, said assembly being removable as a unit from said stationary braking element without substantial axial displacement thereof, and comprising a circular releasing magnet, a brake setting spring of coil form mounted within a center opening in said magnet, a nut threaded within the center opening in said magnet and rotatable to adjust said spring, and an element mounted upon the exterior of said magnet and operable to effect release of said brake, said element being also operable to adjust said nut for variation of the brake setting pressure of said spring.

2. A multi disk friction brake including a circular releasing magnet, a brake setting spring of coil form mounted within a center opening in said magnet, a nut threaded within the center opening in said magnet and rotatable to adjust said spring and a lever mounted upon the exterior of said magnet and operable to effect manual release of the brake, said lever being also operable to adjust said nut for variation of the brake setting pressure of said spring.

3. An electromagnetic brake comprising a rotatable braking element, a pair of non-rotatable braking elements arranged on opposite sides of said former braking element, one of said non-rotatable braking elements being fixed and the other being capable of axial movement, a brake releasing magnet concentrically disposed with respect to said braking elements and detachably secured to said fixed braking element, said magnet including a stationary field member and a movable armature member, an adjustable operating connection between said armature member and said axially movable non-rotatable braking element, a brake setting spring located within a center opening in said field member and acting through the medium of said armature member and said adjustable operating connection to effect setting of the brake, and a stem associated with said operating connection and with said armature member, said stem being rotatable to adjust said operating connection for variation of the position of said armature member with respect to said axially movable non-rotatable element and also being movable axially to move said armature against the action of said spring for release of the brake.

4. An electromagnetic brake comprising a rotatable braking element, a pair of non-rotatable braking elements arranged on opposite sides of said former braking element, one of said non-rotatable braking elements being fixed and the other being capable of axial movement, a brake releasing magnet concentrically disposed with respect to said braking elements and detachably secured to said fixed braking element, said magnet including a stationary field member and a movable armature member, an adjustable operating connection between said armature member and said axially movable non-rotatable braking element, a brake setting spring located within a center opening in said field member and acting through the medium of said armature member and said adjustable operating connection to effect setting of the brake, a stem associated with said operating connection and with said armature member, said stem being rotatable to adjust said operating connection for variation of the position of said armature member with respect to said axially movable non-rotatable element and also being movable axially to move said armature against the action of said spring for release of the brake, and a lever mounted upon said magnet and operatively connected to said stem for effecting manual release of the brake.

5. An electromagnetic brake comprising a rotatable braking element, a pair of non-rotatable braking elements arranged on opposite sides of said former braking element, one of said non-rotatable braking elements being fixed and the other being capable of axial movement, a brake releasing magnet concentrically disposed with respect to said braking elements and detachably secured to said fixed braking element, said magnet including a stationary field member and a movable armature member, an adjustable operating connection between said armature member and said axially movable non-rotatable braking element, a brake setting spring located within a center opening in said field member and acting through the medium of said armature member and said adjustable operating connection to effect setting of the brake, a nut threaded within the center opening in said field member for adjusting said spring, a stem associated with said operating connection and with said armature member and extending through the center opening in said nut, said stem being rotatable to adjust said operating connection for variation of the position of said armature member with respect to said axially movable non-rotatable element and also being movable axially to move said armature against the action of said spring for release of the brake and a manual operating lever mounted upon the exterior of said magnet for effecting manual release of the brake through the medium of said stem, said lever being also operable to adjust said nut for variation of the brake setting pressure of said spring.

6. An electromagnetic brake comprising a rotatable braking element, a pair of non-rotatable braking elements arranged on opposite sides of said former braking element, one of said non-rotatable braking elements being fixed and the other being capable of axial movement, a brake releasing magnet concentrically disposed with respect to said braking elements and detachably secured to said fixed braking element, said magnet including a stationary field member and a movable armature member, a centrally located adjusting nut associated with said armature member for engaging said movable non-rotatable braking element on one side thereof, a brake setting spring located within a center opening in said field member and acting through the medium of said armature member and said nut to effect setting of the brake, a stem associated with said nut and with said armature member, said stem being rotatable to adjust said nut for variation of the position of said armature member with respect to said axially movable non-rotatable element and said stem being also movable axially to move said armature against the action of said spring for release of the brake, and spring means associated with said stem for holding said axially movable non-rotatable braking element in engagement with said nut upon release of the brake.

7. An electromagnetic brake comprising a rotatable braking element, a pair of non-rotatable braking elements arranged on opposite sides of said former braking element, one of said non-rotatable braking elements being fixed and the other being capable of axial movement, a brake releasing magnet concentrically disposed with respect to said braking elements and detachably secured to said fixed braking element, said magnet including a stationary field member and a movable armature member, an adjustable operating connection between said armature member and said axially movable non-rotatable braking element, a brake setting spring located within a center opening in said field member and acting through the medium of said armature member and said adjustable operating connection to effect setting of the brake, a nut threaded within the center opening in said field member for adjusting said spring, a stem associated with said operating connection and said armature member and extending through a center opening in said nut, said stem being rotatable to adjust said operating connection for variation of the position of said armature member with respect to said axially movable non-rotatable element and said stem being also movable axially to move said armature against the action of said spring for release of the brake, and a manual operating lever mounted upon said magnet and operatively connected to said stem and said nut to lock the same against rotation, said lever being movable to effect axial movement of said stem for release of the brake, and said lever being also releasable from said stem to render the same operative to effect adjustment of said nut independently of said stem.

HOWARD E. HODGSON.